(12) United States Patent
Choi et al.

(10) Patent No.: US 11,710,851 B2
(45) Date of Patent: Jul. 25, 2023

(54) POLYMERIC SOLID ELECTROLYTE AND LITHIUM SECONDARY BATTERY COMPRISING SAME

(71) Applicant: LG CHEM, LTD., Seoul (KR)

(72) Inventors: Youngcheol Choi, Daejeon (KR); Seungha Kim, Daejeon (KR); Jonghyun Chae, Daejeon (KR); Kyoung Hoon Kim, Daejeon (KR); Yeonju Lee, Daejeon (KR); Daeil Kim, Daejeon (KR); Lucia Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 64 days.

(21) Appl. No.: 16/335,780

(22) PCT Filed: Apr. 12, 2018

(86) PCT No.: PCT/KR2018/004278
§ 371 (c)(1),
(2) Date: Jun. 7, 2019

(87) PCT Pub. No.: WO2018/190644
PCT Pub. Date: Oct. 18, 2018

(65) Prior Publication Data
US 2020/0144666 A1 May 7, 2020

(30) Foreign Application Priority Data

Apr. 14, 2017 (KR) .................. 10-2017-0048306
Apr. 11, 2018 (KR) .................. 10-2018-0042157

(51) Int. Cl.
*H01M 10/0565* (2010.01)
*H01M 10/0525* (2010.01)
(Continued)

(52) U.S. Cl.
CPC ..... *H01M 10/0565* (2013.01); *H01M 10/052* (2013.01); *H01M 10/056* (2013.01);
(Continued)

(58) Field of Classification Search
None
See application file for complete search history.

(56) References Cited

U.S. PATENT DOCUMENTS 6,280,880 B1 8/2001 Schwoebel et al.
6,645,675 B1 11/2003 Munshi
(Continued)

FOREIGN PATENT DOCUMENTS

CN 102468466 A 5/2012
CN 102668190 A 9/2012
(Continued)

OTHER PUBLICATIONS

Becke et al., "Density-functional thermochemistry. III. The role of exact exchange", Journal of Chemical Physics, vol. 98, 5648, 1993, pp. 1-5.
(Continued)

*Primary Examiner* — Zhongqing Wei
(74) *Attorney, Agent, or Firm* — Birch, Stewart, Kolasch & Birch, LLP

(57) ABSTRACT

A polymer solid electrolyte having high ion conductivity, heat resistance and dimensional stability, and having excellent oxidation stability and voltage stability, and a lithium secondary battery including the same.

5 Claims, 1 Drawing Sheet

(51) Int. Cl.
*H01M 10/052* (2010.01)
*H01M 10/056* (2010.01)
*H01M 4/02* (2006.01)

(52) U.S. Cl.
CPC .. *H01M 10/0525* (2013.01); *H01M 2004/028* (2013.01); *H01M 2300/0028* (2013.01); *H01M 2300/0054* (2013.01); *H01M 2300/0082* (2013.01); *H01M 2300/0094* (2013.01); *Y02E 60/10* (2013.01)

(56) References Cited

U.S. PATENT DOCUMENTS

| | | | |
|---|---|---|---|
| 2003/0091904 | A1 | 5/2003 | Munshi |
| 2005/0245693 | A1 | 11/2005 | Bhatt |
| 2006/0166047 | A1 | 7/2006 | Yoshimura et al. |
| 2011/0020711 | A1 | 1/2011 | Okano et al. |
| 2012/0202102 | A1 | 8/2012 | Kakibe et al. |
| 2012/0214064 | A1 | 8/2012 | Sabi |
| 2013/0309549 | A1 | 11/2013 | Luski et al. |
| 2014/0370358 | A1* | 12/2014 | Hong ............... H01M 50/449 429/126 |
| 2015/0155559 | A1 | 6/2015 | Zimmerman et al. |
| 2015/0280218 | A1 | 10/2015 | Zimmerman et al. |

FOREIGN PATENT DOCUMENTS

| | | |
|---|---|---|
| CN | 106489217 A | 3/2017 |
| JP | 2001-55666 A | 2/2001 |
| JP | 2003-503822 A | 1/2003 |
| JP | 2003-508886 A | 3/2003 |
| JP | 2004-83864 A | 3/2004 |
| JP | 2007-63373 A | 3/2007 |
| JP | 2007-335265 A | 12/2007 |
| JP | 2016-540353 A | 12/2016 |
| KR | 10-1999-0086416 A | 12/1999 |
| KR | 10-2005-0013162 A | 2/2005 |
| KR | 10-2007-0017191 A | 2/2007 |
| KR | 10-2012-0134048 A | 12/2012 |
| KR | 10-2016-0115912 A | 10/2016 |
| WO | WO 2015/084940 A1 | 6/2015 |

OTHER PUBLICATIONS

Gaussian 09 Revision C.01, Expanding the limits of computational chemistry, Gaussian Inc., Wallingford, CT, 2009, pp. 1-6.
International Search Report issued in PCT/KR2018/004278 (PCT/ISA/210), dated Jul. 24, 2018.
Kita et al., "Characteristics of the electrolyte with fluoro organic lithium salts", Journal of Power Sources, vol. 90, 2000, pp. 27-32.
Long et al., "Polymer electrolytes for lithium polymer batteries", Journal of Materials Chemistry A, vol. 4, 2016, pp. 10038-10069.
Tran et al., "Hybrid exchange-correlation energy functionals for strongly correlated electrons: Applications to transition-metal monoxides", Physical Review B, vol. 74, 155108, 2006, pp. 1-10.
Korean Office Action for Korean Application No. 10-2018-0042157, dated Jun. 18, 2019.
Extended European Search Report for European Application No. 18784357.8, dated May 23, 2019.
Masaki et al., "Fluorinated Poly(aryl thioether)s and Poly(aryl sulfone)s Derived from 2,3,4,5,6-Pentafluorobenzoic Acid," Journal of Applied Polymer Science, vol. 108, 2008 (published online Jan. 2, 2008), pp. 498-503.

\* cited by examiner

【Figure 1】
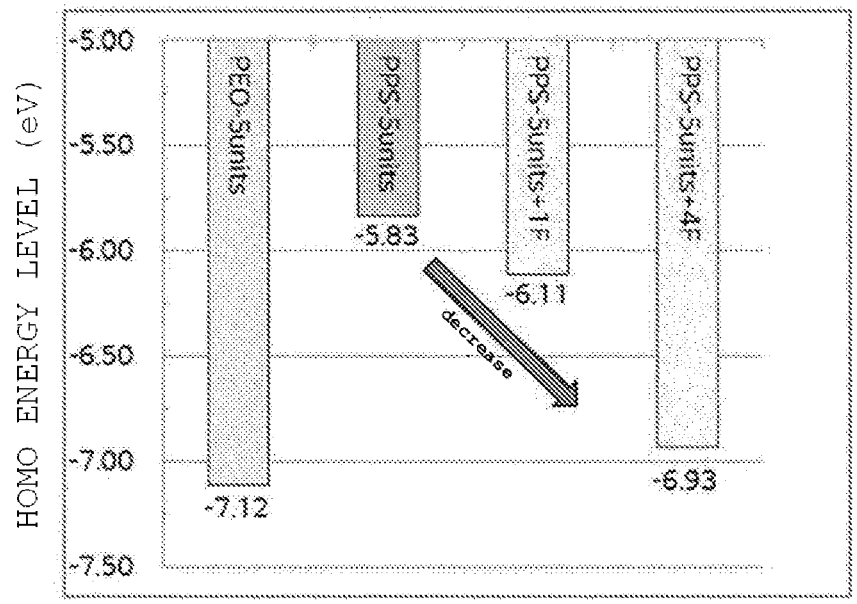
【Figure 2】
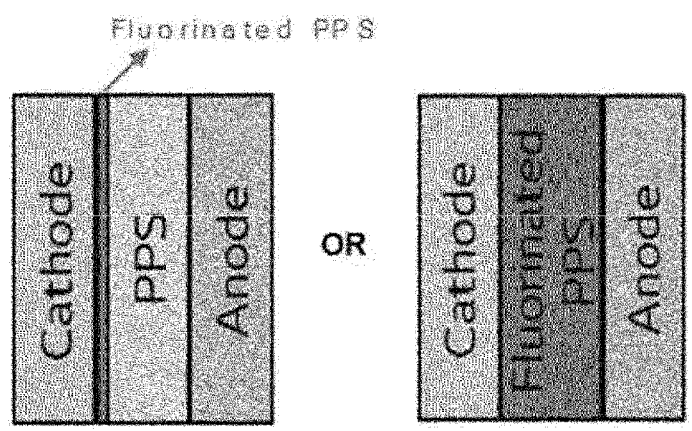

POLYMERIC SOLID ELECTROLYTE AND LITHIUM SECONDARY BATTERY COMPRISING SAME

TECHNICAL FIELD

This application claims priority to and the benefits of Korean Patent Application No. 10-2017-0048306, filed with the Korean Intellectual Property Office on Apr. 14, 2017, and Korean Patent Application No. 10-2018-0042157, filed with the Korean Intellectual Property Office on Apr. 11, 2018, the entire contents of which are incorporated herein by reference.

The present invention relates to a polymer solid electrolyte and a lithium secondary battery including the same.

BACKGROUND ART

Lithium secondary batteries have been used in various industries from small electronic devices including smart phones, laptops or tablet PCs to car batteries and the like. Progresses have been made in a technology direction of these becoming smaller, lighter, high performance and high capacity.

A lithium secondary battery includes a negative electrode, a positive electrode and an electrolyte. Lithium, carbon and the like are used as the negative electrode active material of the lithium secondary battery, and transition metal oxides, metal chalcogen compounds, conductive polymers and the like are used as the positive electrode active material, and as the electrolyte, liquid electrolytes, solid electrolytes, polymer electrolytes and the like are used.

Among these, polymer electrolytes are environmental-friendly without problems such as liquid leakage occurring in liquid electrolytes, and are able to be processed to a thin film and a film form leading to an advantage of readily modifying a device structure to all desired forms.

A polymer electrolyte is a material formed with a polymer, a lithium salt, a non-aqueous organic solvent (optional) and other additives, and exhibits ion conductivity of approximately $10^{-3}$ S/cm to $10^{-8}$ S/cm at room temperature.

As the polymer, polyethylene oxide or polypropylene oxide has been mostly used, and recently, development of polymer electrolytes using various polymers such as polymethyl methacrylate, polyacrylonitrile, polyvinyl chloride and polyvinylidene fluoride has been made.

As one example, US Patent Application Laid-Open Publication No. 2015/015559 discloses a polyphenylene sulfide-based polymer solid electrolyte having excellent chemical resistance and heat resistance. The polymer solid electrolyte has been reported to have excellent ion conductivity at room temperature.

Such a polymer solid electrolyte is required to be electrochemically stable in a battery driving voltage range. \\When oxidation stability of a polymer solid electrolyte decreases, polymer oxidation readily occurs at an interface with a positive electrode, which leads to electrolyte degradation. This ultimately causes battery performance degradation, and therefore, is a problem that needs to be resolved, however, polymer solid electrolytes having ion conductivity and oxidation stability at a satisfiable level have not been developed yet.

Accordingly, development of new polymer solid electrolytes capable of securing interfacial stability while exhibiting excellent ion conductivity at room temperature has been required.

PRIOR ART DOCUMENTS

Patent Documents (Patent Document 1) US Patent Application Laid-Open Publication No. 2015/015559, SOLID, IONICALLY CONDUCTING POLYMER MATERIAL, AND METHODS AND APPLICATIONS FOR SAME

DISCLOSURE

Technical Problem

In view of the above, the inventors of the present invention have conducted extensive studies for developing a polymer solid electrolyte having high ion conductivity, heat resistance, dimensional stability and oxidation stability, and as a result, have completed the present invention.

Accordingly, an aspect of the present invention provides a polymer solid electrolyte composition having the above-mentioned effects.

Another aspect of the present invention provides a lithium secondary battery including a polymer film prepared using the polymer solid electrolyte composition.

Technical Solution

According to a first aspect of the present invention, there is provided a polymer solid electrolyte composition including polyphenylene sulfide and an ion supplying compound, wherein, in the polyphenylene sulfide, some or all of the hydrogens of the phenyl group are substituted with fluorine.

In one specific embodiment of the present invention, the polyphenylene sulfide includes 0.1% by weight to 45.0% by weight of the fluorine.

In one specific embodiment of the present invention, the polyphenylene sulfide has a weight average molecular weight of 200 g/mol to 300,000 g/mol.

In one specific embodiment of the present invention, the ion supplying compound is a metal oxide, a metal hydrate or a metal salt, and the metal is selected from the group consisting of Li, Na, K, Mg, Ca, Zn, Al and combinations thereof.

In one specific embodiment of the present invention, the ion supplying compound is the metal salt, wherein the metal salt is a lithium salt, and the lithium salt is selected from the group consisting of LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, Li(FSO$_2$)$_2$N, LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$NLi, LiOH·H$_2$O, LiB(C$_2$O$_4$)$_2$, chloroborane lithium, lower aliphatic carboxylic acid lithium, lithium tetraphenylborate, lithium imide and combinations thereof.

In one specific embodiment of the present invention, the polymer solid electrolyte composition includes 5% by weight to 40% by weight of the ion supplying compound.

In one specific embodiment of the present invention, the polymer solid electrolyte composition further includes a solvent, the solvent is selected from the group consisting of methanol, ethanol, acetone, acetonitrile, tetrahydrofuran, N-methyl-2-pyrrolidone, N,N-dimethylformamide, N,N-diethylformamide, N,N-dimethylacetamide, dimethyl sulfoxide, hexamethylphosamide, 1,3-dimethyl-2-imidazolidinone, triethyl phosphate, gamma-butyrolactone, 1,2-dimethoxyethane, dimethyl carbonate, ethylmethyl carbonate, diethyl carbonate and combinations thereof.

In one specific embodiment of the present invention, the polymer solid electrolyte composition has viscosity of 200 cP to 1,000 cP at 30° C.

According to a second aspect of the present invention, there is provided a polymer solid electrolyte membrane including the above-described polymer solid electrolyte composition processed to a film.

According to a third aspect of the present invention, there is provided a lithium secondary battery including the above-described polymer solid electrolyte membrane laminated on a positive electrode.

Advantageous Effects

A polymer solid electrolyte according to the present invention exhibits excellent heat resistance and dimensional stability together with high ion conductivity, and has enhanced oxidation stability, and as a result, enhances voltage stability of a lithium secondary battery.

DESCRIPTION OF DRAWINGS

FIG. 1 is a graph comparing HOMO energy levels of a polyethylene oxide oligomer and a polyphenylene sulfide oligomer unsubstituted or substituted with fluorine.

FIG. 2 illustrates an embodiment of a lithium secondary battery according to the present invention.

BEST MODE

The present invention provides a technology for preparing a polymer solid electrolyte composition including polyphenylene sulfide in which some or all of the hydrogens of the phenyl group are substituted with fluorine, and then using this composition in a lithium secondary battery.

Polymer Solid Electrolyte Composition

The present invention provides a polymer solid electrolyte composition including polyphenylene sulfide and an ion supplying compound, wherein, in the polyphenylene sulfide, some or all of the hydrogens of the phenyl group are substituted with fluorine.

Polyphenylene sulfide (PPS) is one of thermoplastic plastics (crystalline polymers) having excellent dimensional stability, and has advantages of maintaining the strength even under a high temperature and erosive environment, and having superior chemical resistance and heat resistance. In view of the above, there have been attempts to use polyphenylene sulfide as a base polymer of a polymer solid electrolyte.

However, pure polyphenylene sulfide with no other element substitution has a problem of somewhat inferior oxidation stability. Oxidation stability of an electrolyte affects battery lifetime properties, that is, a capacity retention rate. When oxidation stability of an electrolyte decreases, electron migration occurs from the electrolyte to a positive electrode on the positive electrode surface during charge, and such an electrolyte oxidation eventually leads to battery lifetime degradation. Accordingly, a polymer electrolyte needs to have no degradation reaction caused by oxidation and reduction in a driving voltage range of a battery.

Oxidation stability of a polymer solid electrolyte may be predicted from a highest occupied molecular orbital (HOMO) energy level (Kita et al., *J. Power Sources.*, 2000, 90, 27-32). In other words, electron migration to a positive electrode becomes difficult as a polymer HOMO energy level is lower, and therefore, when using a polymer with a low HOMO energy level as an electrolyte, an electrolyte oxidation occurs at a higher voltage (voltage of a positive electrode during charge). Accordingly, when using such a polymer solid electrolyte, a battery may be stably operated without battery lifetime degradation even at a relatively high voltage.

In view of the above, the inventors of the present invention have studied a method capable of enhancing oxidation stability while using polyphenylene sulfide as a base polymer, and as a result, have identified that a HOMO energy level of a polymer decreases when some or all of the hydrogens of the phenyl group in polyphenylene sulfide are substituted with fluorine, and oxidation stability of a polymer solid electrolyte is enhanced therefrom, which enhances voltage stability of a lithium secondary battery.

The polyphenylene sulfide used as a lithium ion conducting polymer in the present invention includes a repeating unit represented by the following Chemical Formula 1.

[Chemical Formula 1]

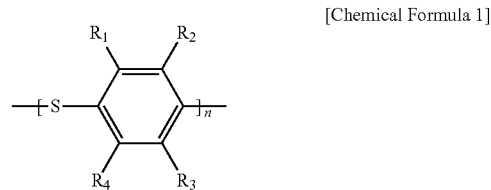

In Chemical Formula 1, $R_1$ to $R_4$ are the same as or different from each other, are each H or F, at least one or more are F, and n is an integer of 2 or greater.

As one embodiment, fluorine-substituted polysulfide used in the composition of the present invention may be formed including one or more of repeating units having the following structural formulae.

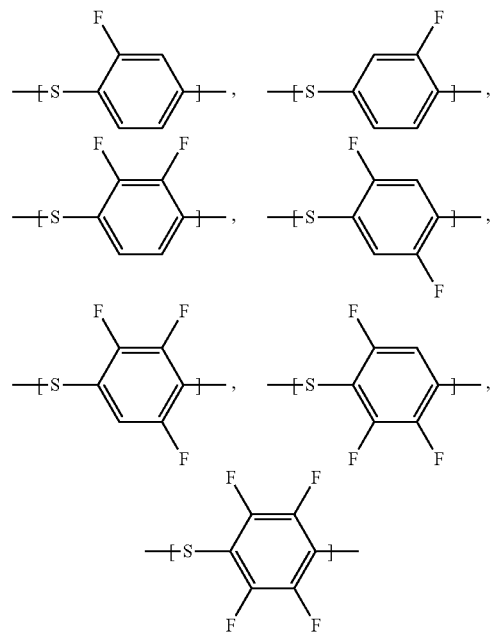

When substituting some or all of the hydrogens of the phenyl group in polyphenylene sulfide with fluorine, a HOMO energy level of a polymer solid electrolyte decreases enhancing oxidation stability. In the present invention, the polyphenylene sulfide may include 0.1% by weight to 45% by weight, preferably 5% by weight to 45% by weight, and more preferably 10% by weight to 45% by weight of fluorine. When the polyphenylene sulfide includes fluorine in the above-described range, oxidation stability in a suitable range to be used for a polymer solid electrolyte is obtained.

A HOMO energy level of the polymer solid electrolyte may be calculated using a Gaussian09 program package (Gaussian 09 Revision C.01, Gaussian Inc., Wallingford, Conn., 2009.), and oxidation stability of the polymer solid electrolyte may be predicted therefrom.

Specifically, a density functional theory (DFT) calculation method is used in the calculation, and B3PW91 functional and 6-31+G* basis sets are used (*Phys. Rev. B* 2006, 74, 155108. and *J. Phys.: Condens. Matter* 1993, 98, 5648.). For a monomer of the polymer to calculate an energy level, structure optimization of the monomer is performed in a gas phase, and then a HOMO energy level is calculated through electron structure optimization in the optimized molecular structure.

Results of calculating a HOMO energy level for the following 4 types of oligomers using the above-mentioned calculation method are shown in FIG. 1.

electrolyte. When the weight average molecular weight is less than 200 g/mol, properties such as mechanical strength (thread properties), chemical resistance or heat resistance decline, and when greater than 300,000 g/mol, a film is not readily prepared.

The polyphenylene sulfide is a crystalline polymer partly forming a crystal form, and, with the base polymer having a degree of crystallinity of 30% to 100% and preferably 50% to 100%, is a crystalline or semi-crystalline polymer. In addition, the glass transition temperature is 80° C. or higher, preferably 120° C., more preferably 150° C. or higher, and most preferably 200° C. or higher. The base polymer has a melting temperature of 250° C. or higher, preferably 280° C. or higher and more preferably 320° C. or higher. In addition, the polyphenylene sulfide having the above-mentioned structure includes all three types of linear type, cross-linked type, and semi-cross-linked type depending on the linking form of S, and the present invention includes all of these structures.

A method for preparing the fluorine-substituted polyphenylene sulfide is not particularly limited in the present invention, and may vary. As one example, fluorine-substi-

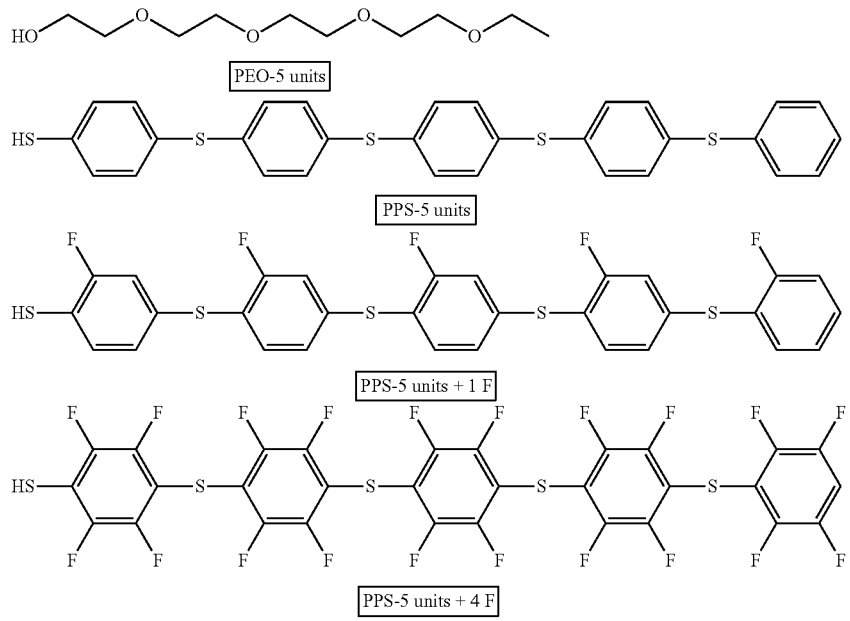

When referring to FIG. 1, energy level is high in polyphenylene sulfide with no phenyl group hydrogen substitution, and oxidation stability is expected to significantly decrease compared to polyethylene oxide (PEO) commonly used as a polymer solid electrolyte. However, when phenyl group hydrogens of polyphenylene sulfide are substituted with fluorine, the energy level gradually decreases, and it is seen that, when all phenyl group hydrogens in the 5 repeating units are substituted with fluorine, the energy level decreases to a similar level with polyethylene oxide. From such calculation results, it may be expected that oxidation stability of a polyphenylene sulfide-based polymer solid electrolyte may be enhanced by substituting phenyl group hydrogens with fluorine.

In the present invention, the fluorine-substituted polyphenylene sulfide has a weight average molecular weight range of 200 g/mol to 300,000 g/mol when used as a polymer solid tuted polyphenylene sulfide may be prepared by fluorinating a pure polyphenylene sulfide polymer obtained through a polymerization reaction of an aromatic monomer that is not substituted with fluorine (for example, dihalobenzene such as diiodobenzene or dichlorobenzene) and elemental sulfur or sodium sulfide using a known halogenation method. As another example, a method of polymerizing an aromatic monomer having one or more fluorine substituents and elemental sulfur or sodium sulfide may be used.

The ion supplying compound is for supplying ions in the polymer solid electrolyte composition, and either includes a compound including a hydroxyl ion, or a material capable of being chemically converted to a compound including a hydroxyl group, for example, the hydroxides, the oxides, the salts, or mixtures thereof, but is not limited thereto.

According to one embodiment of the present invention, the ion supplying compound may be a metal oxide or hydrate or salt. More specifically, $Li_2O$, $Na_2O$, MgO, CaO, ZnO, LiOH, KOH, NaOH, $CaCl_2$, $AlCl_3$, $MgCl_2$ or the like may be used, and these may be used as a mixture of at least one or more types.

According to one embodiment of the present invention, the ion supplying compound may be a lithium salt.

The lithium salt also has an effect of increasing lithium ion conductivity in addition to ion supply. As the lithium salt, for example, one type of lithium salt selected from the group consisting of LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $Li(FSO_2)_2N$ $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)_2NLi$, $LiOH \cdot H_2O$, $LiB(C_2O_4)_2$, chloroborane lithium, lower aliphatic carboxylic acid lithium, lithium tetraphenylborate, lithium imide and combinations thereof may be used.

Preferably, the ion supplying compound is included in 5% by weight to 40% by weight and preferably in 10% by weight to 30% by weight in the whole polymer solid electrolyte. When the ion supplying compound content is less than the above-mentioned range, lithium ion conductivity is not readily secured, and when the content is greater than the above-mentioned range on the contrary, a significant increase in the effect is not obtained, which is uneconomical, and therefore, the content is properly selected within the above-mentioned range.

As a result, although it has a solid film form, the polymer solid electrolyte membrane provided in the present invention secures an effect of increasing a high level of lithium ion conductivity of $10^{-4}$ S/cm equivalent to a liquid phase, and enhancing properties of a film including the same as well.

The polymer solid electrolyte composition provided above is prepared to a film form through a wet process, and for this, includes a solvent.

As the solvent, solvents capable of dissolving the lithium ion conducting polymer may be used, and as one example, the organic solvent may include one or more types selected from the group consisting of methanol, ethanol, acetone, acetonitrile, tetrahydrofuran, N-methyl-2-pyrrolidone, N,N-dimethylformamide, N,N-diethylformamide, N,N-dimethylacetamide, dimethyl sulfoxide, hexamethylphosamide, 1,3-dimethyl-2-imidazolidinone, triethyl phosphate, gamma-butyrolactone, 1,2-dimethoxyethane, dimethyl carbonate, ethylmethyl carbonate and diethyl carbonate.

As for the solvent content, the content is limited considering viscosity of a finally obtained polymer solid electrolyte composition. In other words, workability declines as the solvent content increases since viscosity of a finally obtained composition increases, and when the content decreases on the contrary, viscosity decreases making a preparation process of a polymer solid electrolyte membrane difficult.

In addition, although solution viscosity of the polymer solid electrolyte composition of the present invention at 30° C. is not particularly limited, the solution viscosity may be preferably from 200 cP to 1,000 cP, preferably from 300 cP to 800 cP or less, and more preferably from 500 cP to 700 cP. Such viscosity control enables to secure viscosity enhancing film processability in preparing the polymer solid electrolyte to a film.

When the viscosity is greater than the above-mentioned range, a transverse direction (TD) thickness becomes non-uniform due to decline in the coating solution flatness, and fluidity disappears making uniform coating difficult in some cases, and when the viscosity is less than the above-mentioned range on the contrary, stain occurrences caused by an excessive flow of the coating solution may be prevented when coating, and causes a problem of mechanical direction (MD) thickness being non-uniform.

Polymer Solid Electrolyte Membrane

The polymer solid electrolyte composition may be formed to a polymer solid electrolyte membrane via a film preparation process known in the art. The polymer solid electrolyte membrane of the present invention may be either used as a polymer solid electrolyte alone, or used only at a positive electrode interface. When using the polymer solid electrolyte membrane of the present invention only at a positive electrode interface, a polymer solid electrolyte adjoining a negative electrode interface may be a pure polyphenylene sulfide polymer solid electrolyte not substituted with fluorine.

Examples of the film molding method may include any proper film molding method such as a solution casting method, a melt extrusion method, a calendar method or a compression molding method. Among these film molding methods, a solution casting method or a melt extrusion method is preferred.

As one example, a solution casting method may be used for preparing the film.

In the solution casting method, coating of the polymer solid electrolyte composition is carried out on a support, and as for the support herein, a process of directly coating on any one of a positive electrode or a negative electrode, or coating on a separate substrate, separating the same, and then laminating with a positive electrode and a negative electrode may be carried out.

Herein, the substrate may be a glass substrate or a plastic substrate. As the plastic substrate, various plastic films such as polyethylene terephthalate, polyethylene naphthalate, polypropylene, polyethylene, cellulose triacetate, cellulose diacetate, poly(meth)acrylic acid alkyl ester, a poly(meth)acrylic acid ester copolymer, polyvinyl chloride, polyvinyl alcohol, polycarbonate, polystyrene, cellophane, a polyvinylidene chloride copolymer, polyamide, polyimide, a vinyl chloride vinyl acetate copolymer, polytetrafluoroethylene, and polytrifluoroethylene may be included. In addition, composite materials formed with two or more types thereof may also be used, and a polyethylene terephthalate film having excellent light transmittance is particularly preferred. The support has a thickness of preferably 5 μm to 150 μm and more preferably 10 μm to 50 μm.

For example, methods of spin coating, doctor blade coating, dip coating, solvent casting, slot die coating, spray coating, roll coating, extrusion coating, curtain coating, die coating, wire bar coating, knife coating or the like may be used.

Herein, parameter adjustments are required in each process for preparing a uniform polymer solid electrolyte membrane.

As one example, spin coating may be performed at 500 rpm to 4000 rpm, and doctor blade coating may use a device having a thickness gap of 10 μm to 200 μm. In addition, spray coating may be performed by spraying for 5 times to 100 times of injections through an injection pressure of 0.5 MPa to 20 MPa. Such process design and parameter selection may be controlled by those skilled in the art.

After the coating, drying is carried out to form the polymer solid electrolyte membrane.

The drying may vary depending on each constituent, the organic solvent type and the content ratio, but is preferably carried out for 30 seconds to 15 minutes at 60° C. to 100° C.

Herein, the drying may be carried out using one method among hot air drying, electromagnetic wave drying, vacuum drying, spray drying, drum drying and freeze drying, and preferably, hot air drying is used.

After carrying out the coating and the drying, the polymer solid electrolyte membrane thickness is formed to a thickness of a membrane to finally prepare, and when necessary, the coating-drying or the coating is carried out one or more times.

As another example, a melt extrusion method may be used for preparing the film.

Examples of the melt extrusion method may include a T die method, an inflation method and the like. The molding temperature is preferably from 150° C. to 350° C. and more preferably from 200° C. to 300° C.

When molding the film using the T-die method, a T-die is installed on the fore-end of a known monoaxial extruder or a biaxial extruder, and a roll-shaped film may be obtained by winding the film extruded in a film shape.

As necessary, the heat melting may go through processes of first heat melting, filtering filter passing and second heat melting in consecutive order. The heat melted temperature during the melt extrusion may be from 170° C. to 320° C. and preferably from 200° C. to 300° C. After melt extruded from the T die, at least one or more metal drums maintaining at 70° C. to 140° C. may be used for cooling and solidifying. When using a drum (casting roll) as above, extrusion may be carried out under the above-described temperature condition or at a lower temperature.

Lithium Secondary Battery

The polymer solid electrolyte membrane provided above has high lithium ion conductivity of a $10^{-4}$ S/cm level, a level equivalent to a liquid electrolyte, and also has excellent heat resistance and dimensional stability, and therefore, may be used in a lithium secondary battery.

Particularly, by the polymer solid electrolyte membrane including an ion supplying compound and polyphenylene sulfide in which some or all are substituted with fluorine, enhanced oxidation stability is obtained, and excellent ion conductivity and properties are obtained compared to polyphenylene sulfide not substituted with fluorine. In addition, problems that occur when operating a lithium secondary battery (heating, explosion, film degradation and the like) are resolved due to heat resistance, durability, chemical resistance, flame retardancy and the like, and voltage stability of the lithium secondary battery may be further enhanced.

The polymer solid electrolyte membrane provided in the present invention is used in a lithium secondary battery, and may be preferably used as a polymer solid electrolyte. Herein, the polymer solid electrolyte membrane is preferably used so as to be in contact with a positive electrode surface in order to secure the above-described effects.

FIG. 2 illustrates an embodiment of the lithium secondary battery according to the present invention.

When referring to FIG. 2, the polymer solid electrolyte membrane of the present invention may be used only at a positive electrode interface. Herein, as an electrolyte adjoining a negative electrode interface, a non-fluorinated pure polyphenylene sulfide polymer solid electrolyte may be used.

In addition, the polymer solid electrolyte membrane of the present invention may be used alone as an electrolyte, and in this case, the polymer solid electrolyte membrane is provided between a positive electrode and a negative electrode.

When using the polymer solid electrolyte membrane of the present invention as a polymer solid electrolyte in contact with a positive electrode interface as above, a phenomenon of the electrolyte being oxidized on the positive electrode surface during battery operation is significantly reduced, and battery lifetime properties may be enhanced.

Moreover, in order to further increase lithium ion conductivity, the electrolyte may further include materials used for this purpose.

When necessary, the polymer solid electrolyte further includes an inorganic solid electrolyte or an organic solid electrolyte. The inorganic solid electrolyte is a ceramic-based material, and crystalline or non-crystalline material may be used, and inorganic solid electrolytes such as thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O12$, $Li_7La_3Zr_2O_{12}$, $Li_6BaLa_2Ta_2O_{12}$, $Li_3PO_{(4-3/2w)}Nw$ (w is w<1) or $Li_{3.6}Si_{0.6}P_{0.4}O_4$ may be used.

Examples of the organic solid electrolyte may include those mixing a lithium salt to a polymer-based material such as polyethylene derivatives, polyethylene oxide derivatives, polypropylene oxide derivatives, phosphoric acid ester polymers, polyagitation lysine, polyester sulfide, polyvinyl alcohol or polyvinylidene fluoride. Herein, these may be used either alone or as a combination of at least one or more.

Specific methods of using as the polymer solid electrolyte is not particularly limited in the present invention, and known methods may be selected or chosen by those skilled in the art.

A lithium secondary battery capable of using the polymer solid electrolyte is not particularly limited in a positive electrode or a negative electrode, and particularly, may be used in lithium-air batteries, lithium oxide batteries, lithium-sulfur batteries, lithium metal batteries, and all solid-state batteries operating at a high temperature.

As the positive electrode of the lithium secondary battery, layer compounds such as lithium cobalt oxide ($LiCoO_2$) or lithium nickel oxide ($LiNiO_2$) or compounds substituted with one or more transition metals; lithium manganese oxides such as a chemical formula of $Li_{1+x}Mn_{2-x}O_4$ ($0 \leq x \leq 0.33$), $LiMnO_3$, $LiMn_2O_3$ or $LiMnO_2$; lithium copper oxide ($Li_2CuO_2$); vanadium oxides such as $LiV_3O_8$, $LiFe_3O_4$, $V_2O_5$ or $Cu_2V_2O_7$; Ni site-type lithium metal oxides represented by a chemical formula of $LiNi_{1-x}M_xO_2$ (M=Co, Mn, Al, Cu, Fe, Mg, B or Ga; $0.01 \leq x \leq 0.3$); lithium manganese composite oxides represented by a chemical formula of $LiMn_2Mn_{2-x}M_xO_2$ (M=Co, Ni, Fe, Cr, Zn or Ta; $0.01 \leq x \leq 0.1$) or $Li_2Mn_3MO_8$ (M=e, Co, Ni, Cu or Zn); spinel-structured lithium manganese composite oxides represented by $LiNi_xMn_{2-x}O_4$; $LiMn_2O_4$ in which some of Li in the chemical formula are substituted with alkaline earth metal ions; disulfide compounds; $Fe_2(MoO_4)_3$, chalcogenides such as $Cu_2Mo_6S_8$, FeS, CoS and MiS, oxides, sulfides or halides of scandium, ruthenium, titanium, vanadium, molybdenum, chromium, manganese, iron, cobalt, nickel, copper, zinc or the like may be used, and more specifically, $TiS_2$, $ZrS_2$, $RuO_2$, $Co_3O_4$, $Mo_6S_8$, $V_2O_5$ or the like may be used, however, the positive electrode is not limited thereto.

Such a positive electrode active material may be formed on a positive electrode current collector. The positive electrode current collector is not particularly limited as long as it has high conductivity without inducing chemical changes to the corresponding battery, and for example, stainless steel, aluminum, nickel, titanium, baked carbon, or aluminum or stainless steel of which surface is treated with carbon, nickel, titanium, silver or the like may be used. Herein, the positive electrode current collector may be used in various forms such as films, sheets, foil, nets, porous bodies, foams and non-woven fabrics with micro-unevenness formed on the surface so that adhesive strength with the positive electrode active material increases.

In addition, as the negative electrode, a negative electrode compound layer having a negative electrode active material is formed on a negative electrode current collector, or a negative electrode compound layer (lithium foil as one example) is used alone.

Herein, types of the negative electrode current collector or the negative electrode compound layer are not particularly limited in the present invention, and known materials may be used.

In addition, the negative electrode current collector is not particularly limited as long it has conductivity without inducing chemical changes to the corresponding battery, and for example, copper, stainless steel, aluminum, nickel, titanium, baked carbon, copper or stainless steel of which surface is treated with carbon, nickel, titanium, silver or the like, aluminum-cadmium alloys and the like may be used. In addition, like the positive electrode current collector, the negative electrode current collector may be used in various forms such as films, sheets, foil, nets, porous bodies, foams and non-woven fabrics with micro-unevenness formed on the surface.

In addition, the negative electrode active material may include one or more carbon-based materials selected from the group consisting of crystalline artificial graphite, crystalline natural graphite, amorphous hard carbon, low-crystalline soft carbon, carbon black, acetylene black, ketjen black, super-P, graphene and fibrous carbon, Si-based materials, metal composite oxides such as $Li_xFe_2O_3$ ($0 \le x \le 1$), $Li_xWO_2$ ($0 \le x \le 1$) or $Sn_xMe_{1-x}Me'_yO_z$ (Me: Mn, Fe, Pb, Ge; Me': Al, B, P, Si, elements of Groups 1, 2 and 3 in the periodic table, halogen; $0<x\le1$; $1\le y\le3$; $1\le z\le8$); lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$; conductive polymers such as polyacetylene; Li—Co—Ni-based materials; titanium oxides; lithium titanium oxides, and the like, but is not limited thereto.

In addition thereto, as the negative electrode active material, metal composite oxides such as $Sn_xMe_{1-x}Me'_yO_z$ (Me: Mn, Fe, Pb, Ge; Me': Al, B, P, Si, elements of Groups 1, 2 and 3 in the periodic table, halogen; $0<x\le1$; $1\le y\le3$; $1\le z\le8$); oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$, and the like, may be used, and carbon-based negative electrode active materials such as crystalline carbon, amorphous carbon or carbon composites may be used either alone or as a mixture of two or more types.

Herein, the electrode compound layer may further include a binder resin, a conductor, a filler, other additives and the like.

The binder resin is used for binding of the electrode active material and the conductor, and for binding on the current collector. Examples of such a binder resin may include polyvinylidene fluoride (PVDF), polyvinyl alcohol, carboxylmethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluorine rubber, various copolymers thereof, and the like.

The conductor is used for further enhancing conductivity of the electrode active material. Such a conductor is not particularly limited as long it has conductivity without inducing chemical changes to the corresponding battery, and examples thereof may include graphite such as natural graphite or artificial graphite; carbon black such as carbon black, acetylene black, ketjen black, channel black, furnace black, lamp black or thermal black; conductive fibers such as carbon fiber or metal fibers; fluorinated carbon, aluminum, metal powders such as nickel powder; conductive whiskers such as zinc oxide or potassium titanate; conductive metal oxides such as titanium oxide; polyphenylene derivatives, and the like.

The filler is optionally used as a component suppressing electrode expansion, and is not particularly limited as long as it is a fibrous material without inducing chemical changes to the corresponding battery. For example, olefin-based polymers such as polyethylene or polypropylene; fibrous materials such as glass fiber or carbon fiber are used.

The shape of the lithium secondary battery described above is not particularly limited, and examples thereof may include a jelly-roll type, a stack type, a stack-folding type (including a stack-Z-folding type), or a lamination-stack type, and may preferably include a stack-folding type.

After preparing such an electrode assembly in which the negative electrode, the polymer solid electrolyte and the positive electrode are consecutively laminated, the result is placed in a battery case, and the result is sealed with a cap plate and a gasket and assembled to manufacture a lithium secondary battery.

Herein, depending on the used positive electrode/negative electrode materials, the lithium secondary battery may be classified into various batteries such as a lithium-sulfur battery, a lithium-air battery, a lithium-oxide battery or a lithium all solid-state battery, and depending on the shape, may be classified into a cylinder type, a square-type, a coin-type, a pouch-type and the like, and depending on the size, may be classified into a bulk type and a thin-film type. Structures and manufacturing methods of these batteries are widely known in the art, and therefore, detailed descriptions will not be included.

The lithium secondary battery according to the present invention may be used as a power supply of devices requiring high capacity and high rate properties. Specific examples of the device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, and e-scooters; electric golf carts; systems for power storage and the like, but are not limited thereto.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also belong to the scope of the attached claims.

EXAMPLE

Example 1

A solution was prepared by mixing fluorine-substituted polyphenylene sulfide having the following repeating unit, and LiTFSI in a weight ratio of 7:3, and dissolving the result in an NMP solvent.

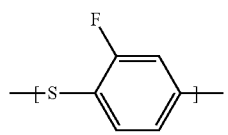

The obtained solution was coated on a Teflon film using doctor blade coating to form a poly(phenylene sulfide-phenylene sulfoxide) film (coating thickness 50 μm).

Then, a polymer solid electrolyte membrane was prepared for 24 hours at room temperature and for 24 hours in a 60° C. vacuum oven.

Example 2

A solution was prepared by mixing fluorine-substituted polyphenylene sulfide having the following repeating unit, and LiTFSI in a weight ratio of 7:3, and dissolving the result in an NMP solvent.

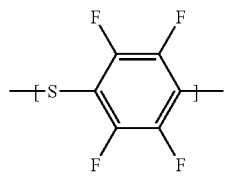

The obtained solution was coated on a Teflon film using doctor blade coating to form a poly(phenylene sulfide-phenylene sulfoxide) film (coating thickness 50 μm).

Then, a polymer solid electrolyte membrane was prepared for 24 hours at room temperature and for 24 hours in a 60° C. vacuum oven.

Comparative Example 1

A solution was prepared by mixing pure polyphenylene sulfide not substituted with fluorine, and LiTFSI in a weight ratio of 7:3, and dissolving the result in an NMP solvent.

The obtained solution was coated on a Teflon film using doctor blade coating (coating thickness 50 μm). A polymer solid electrolyte membrane was prepared for 24 hours at room temperature and for 24 hours in a 60° C. vacuum oven.

Experimental Example 1

Property Measurements (1) Thickness Measurement

As a result of measuring the thickness of the polymer solid electrolyte membranes prepared in the examples and the comparative example, all were measured to be approximately 45 μm.

(2) Lithium Ion Conductivity Measurement

As a result of measuring lithium ion conductivity of the polymer solid electrolyte membranes prepared in the examples and the comparative example using a VSP model impedance measuring device manufactured by Maker: Bio-Logic SAS, there was almost no lithium ion conductivity in Comparative Example 1, and lithium ion conductivity appeared in high value in Examples 1 and 2.

Experimental Example 2

Voltage Stability Measurement

In order to measure voltage stability of the polymer solid electrolyte membranes prepared in the examples and the comparative example, a Li symmetric battery was manufactured, and the film was inserted thereto to manufacture a lithium secondary battery.

High temperature evaluation: After charging the manufactured batteries up to 4.2 V with 1 C, the temperature was raised up to 150° C. at an increase rate of 5° C./minute, and then the batteries were left unattended for 10 minutes at 150° C.

Overcharge: the manufactured batteries were charged up to 12 V with 0.2 C.

As a result of the evaluation, the polymer solid electrolyte membranes of Examples 1 and 2 were capable of reducing a HOMO energy level by 0.28 eV and 1.10 eV, respectively, compared to the polymer solid electrolyte membrane of Comparative Example 1, and thereby had high oxidation stability, and accordingly, it was identified that the lithium secondary batteries of Examples 1 and 2 had excellent voltage stability compared to the battery of Comparative Example 1.

Hereinbefore, preferred embodiments of the present specification have been illustrated and described, however, the present specification is not limited to the specific embodiments described above, and various modified embodiments may be made by those skilled in the art without departing from the gist of the present invention that the claims claim, and such modified embodiments are not to be individually understood from technological ideas or perspectives of the present invention.

The invention claimed is:

1. A lithium secondary battery comprising an electrode assembly in which a positive electrode, a first polymer solid electrolyte membrane in contact with the positive electrode, a second polymer solid electrolyte membrane in contact with a negative electrode and the negative electrode are consecutively laminated,
wherein the first polymer solid electrolyte membrane is manufactured by processing a first polymer solid electrolyte composition into a film,
wherein the second polymer solid electrolyte membrane is manufactured by processing a second polymer solid electrolyte composition into a film,
the first and the second polymer solid electrolyte compositions comprise polyphenylene sulfide and an ion supplying compound,
in the polyphenylene sulfide of the first polymer solid electrolyte composition, some or all of the hydrogens of the phenyl group are substituted with fluorine;
the polyphenylene sulfide of the first polymer solid electrolyte composition includes 0.1% by weight to 45.0% by weight of fluorine;
the polyphenylene sulfide of the second polymer solid electrolyte composition is not substituted with fluorine, and
the first and the second polymer solid electrolyte compositions comprise 5% by weight to 40% by weight of the ion supplying compound.

2. The lithium secondary battery of claim 1, wherein the polyphenylene sulfide has a weight average molecular weight of 200 g/mol to 300,000 g/mol.

3. The lithium secondary battery of claim 1, wherein the ion supplying compound is a metal oxide, a metal hydrate or a metal salt, and the metal is selected from the group consisting of Li, Na, K, Mg, Ca, Zn, Al and combinations thereof.

4. The lithium secondary battery of claim 3, wherein the ion supplying compound is the metal salt, wherein the metal salt is a lithium salt, and the lithium salt is selected from the group consisting of LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, Li(FSO$_2$)$_2$N LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$NLi, LiOH·H$_2$O, LiB(C$_2$O$_4$)$_2$, chloroborane lithium, lower aliphatic carboxylic acid lithium, lithium tetraphenylborate, lithium imide and combinations thereof.

5. The lithium secondary battery of claim 1, further comprising a solvent,
   wherein the solvent is selected from the group consisting of methanol, ethanol, acetone, acetonitrile, tetrahydrofuran, N-methyl-2-pyrrolidone, N,N-dimethylformamide, N,N-diethylformamide, N,N-dimethylacetamide, dimethyl sulfoxide, hexamethylphosamide, 1,3-dimethyl-2-imidazolidinone, triethyl phosphate, gamma-butyrolactone, 1,2-dimethoxyethane, dimethyl carbonate, ethylmethyl carbonate, diethyl carbonate and combinations thereof.

\* \* \* \* \*